US008312778B2

(12) United States Patent
Östling et al.

(10) Patent No.: US 8,312,778 B2
(45) Date of Patent: Nov. 20, 2012

(54) COMBINATION OF A LOAD CELL AND TUBULAR INSERT TO BE MOUNTED IN A BORE

(75) Inventors: Sture Östling, Katrineholm (SE); Henrik E Andersson, Nyköping (SE)

(73) Assignee: Aktiebolaget SKF, Göteborg (SE)

( * ) Notice: Subject to any disclaimer, the term of this patent is extended or adjusted under 35 U.S.C. 154(b) by 309 days.

(21) Appl. No.: 12/450,867

(22) PCT Filed: Mar. 18, 2008

(86) PCT No.: PCT/SE2008/000200
§ 371 (c)(1),
(2), (4) Date: Oct. 16, 2009

(87) PCT Pub. No.: WO2008/130301
PCT Pub. Date: Oct. 30, 2008

(65) Prior Publication Data
US 2010/0126283 A1    May 27, 2010

(30) Foreign Application Priority Data

Apr. 19, 2007 (SE) ........................................ 0700951

(51) Int. Cl.
*G01L 1/22* (2006.01)
(52) U.S. Cl. ................................................. 73/862.045
(58) Field of Classification Search .............. 73/862.045
See application file for complete search history.

(56) References Cited

U.S. PATENT DOCUMENTS

| 4,294,318 A | * | 10/1981 | Desbrandes et al. | .......... 175/321 |
| 4,800,760 A | * | 1/1989 | Wolfer et al. | .............. 73/862.68 |
| 5,113,696 A | * | 5/1992 | Mole | ................................ 73/147 |
| 7,472,599 B2 | * | 1/2009 | Vik et al. | ........................ 73/627 |

FOREIGN PATENT DOCUMENTS

| CH | 679950 A | 5/1992 |
| DE | 3407620 A | 9/1985 |
| EP | 1143230 A | 10/2001 |
| GB | 2030300 A | 4/1980 |

* cited by examiner

*Primary Examiner* — Lisa Caputo
*Assistant Examiner* — Octavia Davis-Hollington
(74) *Attorney, Agent, or Firm* — Mark A. Ussai; Bryan Peckjian

(57) ABSTRACT

The invention relates to a combination of a load cell (7) and a tubular insert (3) for mounting in a bore (2) in a machine component (1), wherein the load cell (7) is structurally connected to an inner sleeve (6), which is axially displaceable inside an outer sleeve (4), which is insertable in the bore (2), the inner and outer sleeves (6, 4) having portions with mutually tapering envelope surfaces facing each other, and a flange (5) being provided for displacing the inner sleeve (6) and the outer sleeve (4) axially relative to each other for expanding the outer sleeve (4) partially for increasing the grip between the insert (3) and the bore (2), thereby giving the load cell (7) a pretension sufficient for emitting signals representative for the load acting on the machine component (1).

10 Claims, 5 Drawing Sheets

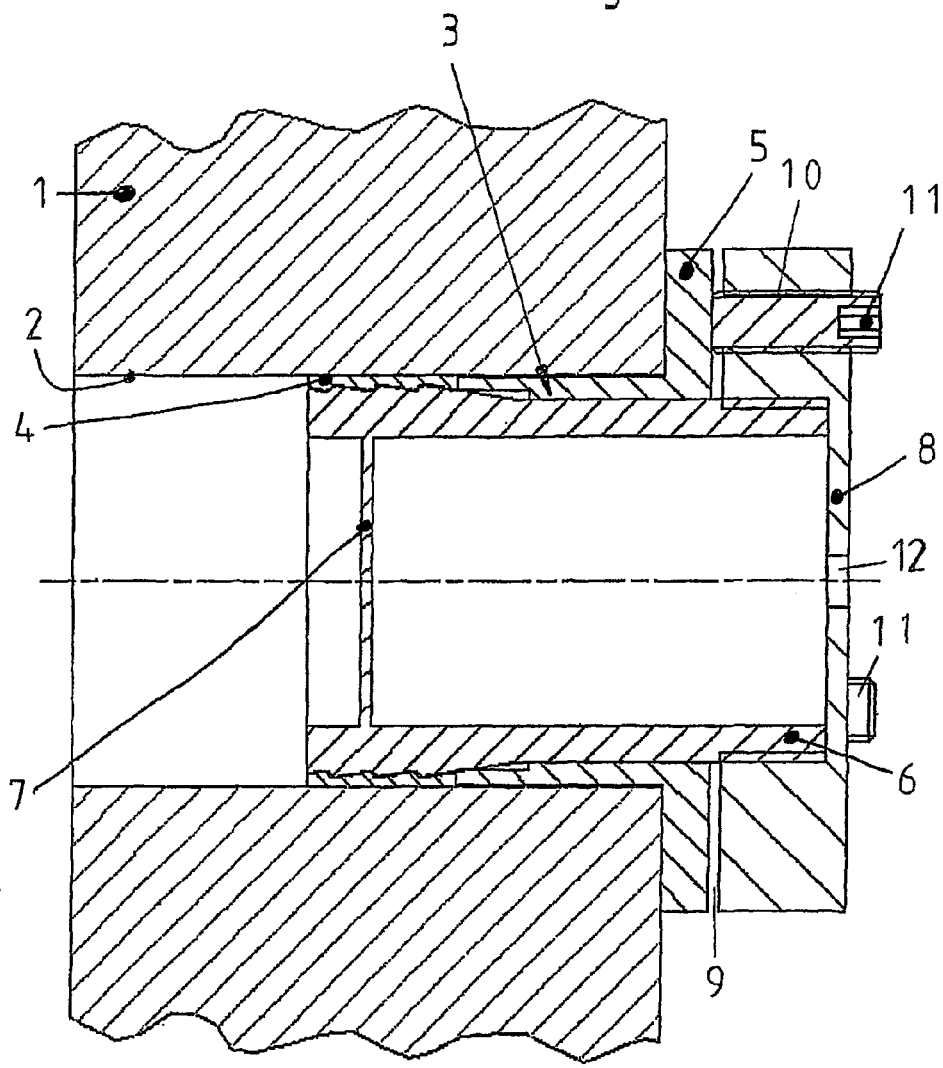

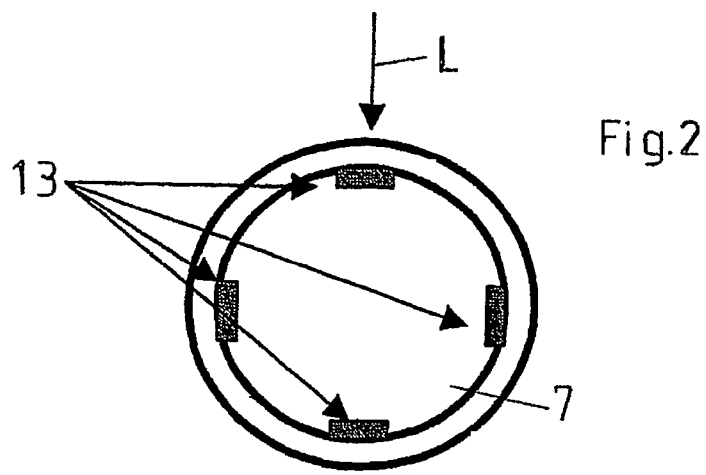
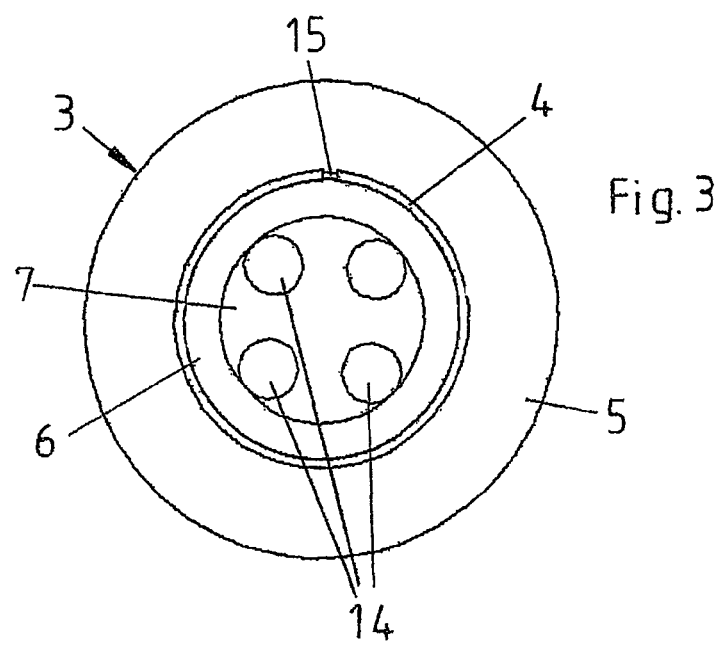
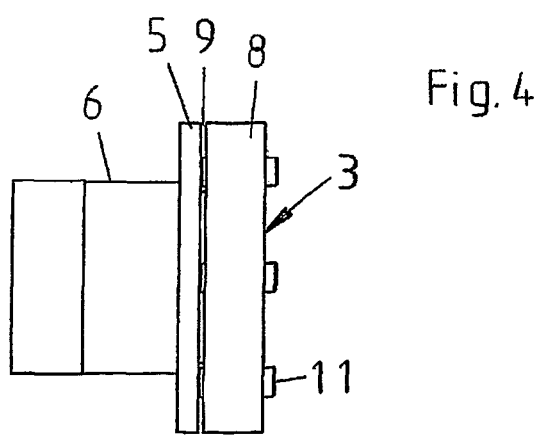

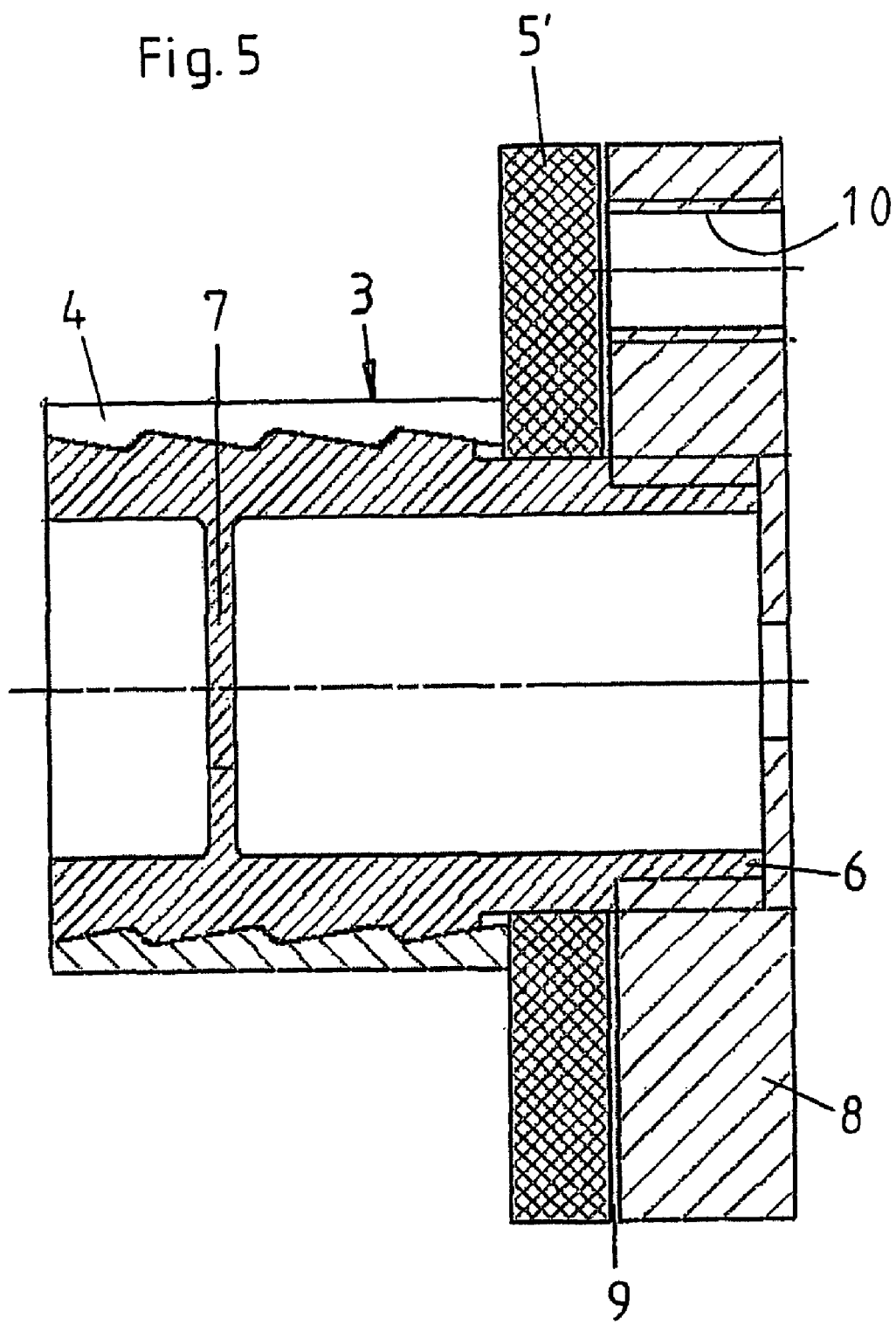

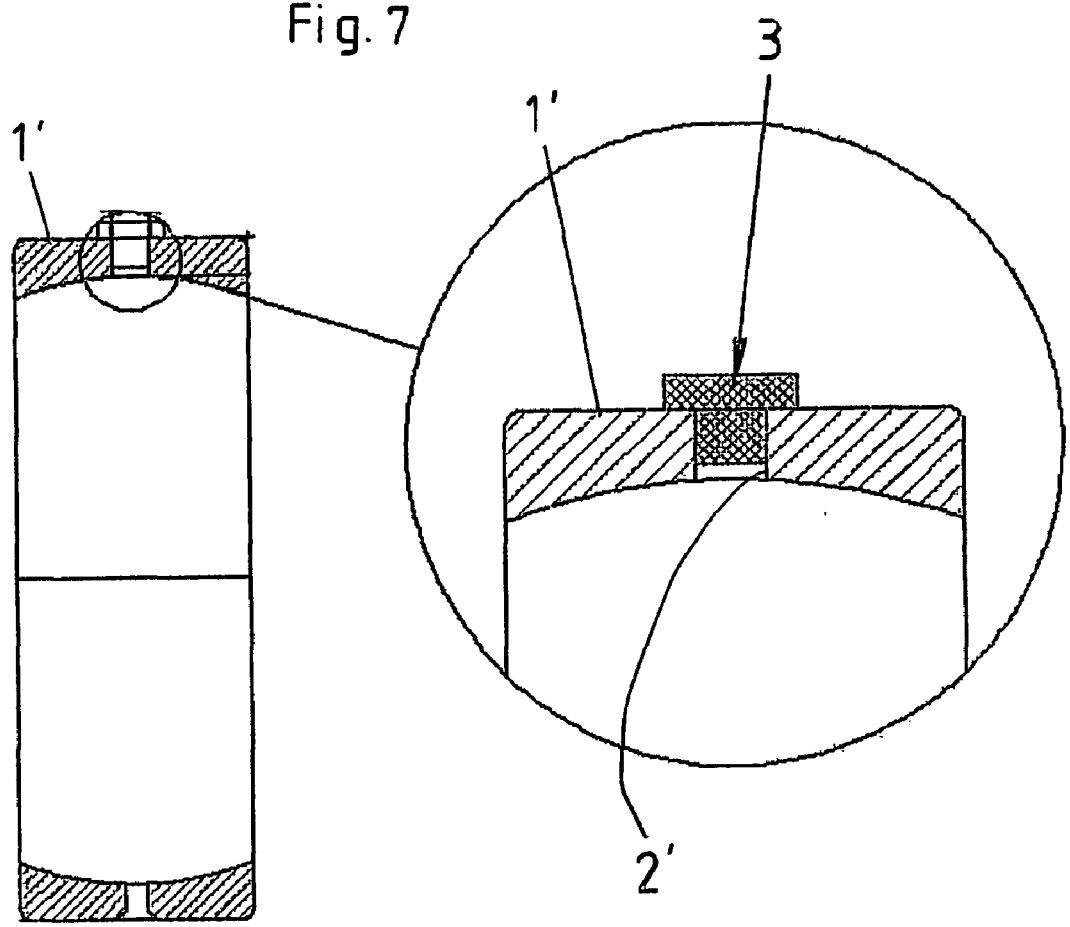

COMBINATION OF A LOAD CELL AND TUBULAR INSERT TO BE MOUNTED IN A BORE

BACKGROUND OF THE INVENTION

The present invention refers to a combination of a load cell and a tubular insert for mounting in a bore in a machine component, e.g. a bore in a bearing housing wall.

In different situations it is of Interest to measure the load acting on a bearing housing or another comparable machine component. Such a situation is at hand for instance in an ore crusher in a mine, where lumps of rock are fed into the crusher and then during rotation of the substantially tubular crusher body is disintegrated into smaller fractions. In such an ore crusher, which is supported for rotation about its longitudinal axis in bearings arranged in bearing housings, a continuous monitoring of the load acting upon the bearings can be used for controlling the operational conditions of the ore crusher and also for controlling the charging of the ore crusher with rock material to be treated.

For this and similar purposes it has been used load cells mainly in form of strain gauges for determining such bearing load. Such a load cell is for instance a sensor marketed by Wesmar AB, Sweden under the name GOZINTA, although there are other examples on load cells appropriate for the task. The GOZINTA load cell has to be pushed into a bore with a very narrow fit, which furthermore makes mounting and dismounting difficult.

During tests it however has been found that the existing solutions give very low output signals, which is believed to be a result of low tension between the load cell and the wall of the measuring object surrounding it.

SUMMARY OF THE INVENTION

The purpose of the present invention is to propose a combined load cell and tubular insert to be mounted in a bore in such a manner that it can make a load cell of the type described, have a sufficient tension in a bore for allowing the load cell to emit output signals high enough to give satisfactory load measuring results, and this has been achieved in that the combination of load cell and tubular insert has been given the features defined in the accompanying claim 1.

BRIEF DESCRIPTION OF THE SEVERAL VIEWS OF THE DRAWINGS

Hereinafter the invention will be further described with reference to embodiments schematically illustrated in the accompanying drawings.

FIG. 1 shows a cross section through a wall with a bore in which is inserted a tubular insert with a load cell, also shown in cross section.

FIG. 2 is a schematic end view illustrating the positioning of strain gauges in the load cell.

FIG. 3 is an end view of the insert with load cell of an embodiment different from the one schematically illustrated in FIG. 2, but resembling to the embodiment incorporated in FIG. 1, FIG. 4 is a side view of the insert as illustrated in FIG. 1, FIG. 5 illustrates schematically in cross section another embodiment of an insert, FIG. 7 is a cross section of a bearing outer race ring, with an example of the fitting of the insert in a bore in the race ring, shown schematically and with an enlarged portion shown encircled.

DETAILED DESCRIPTION OF THE INVENTION

Figure 6:
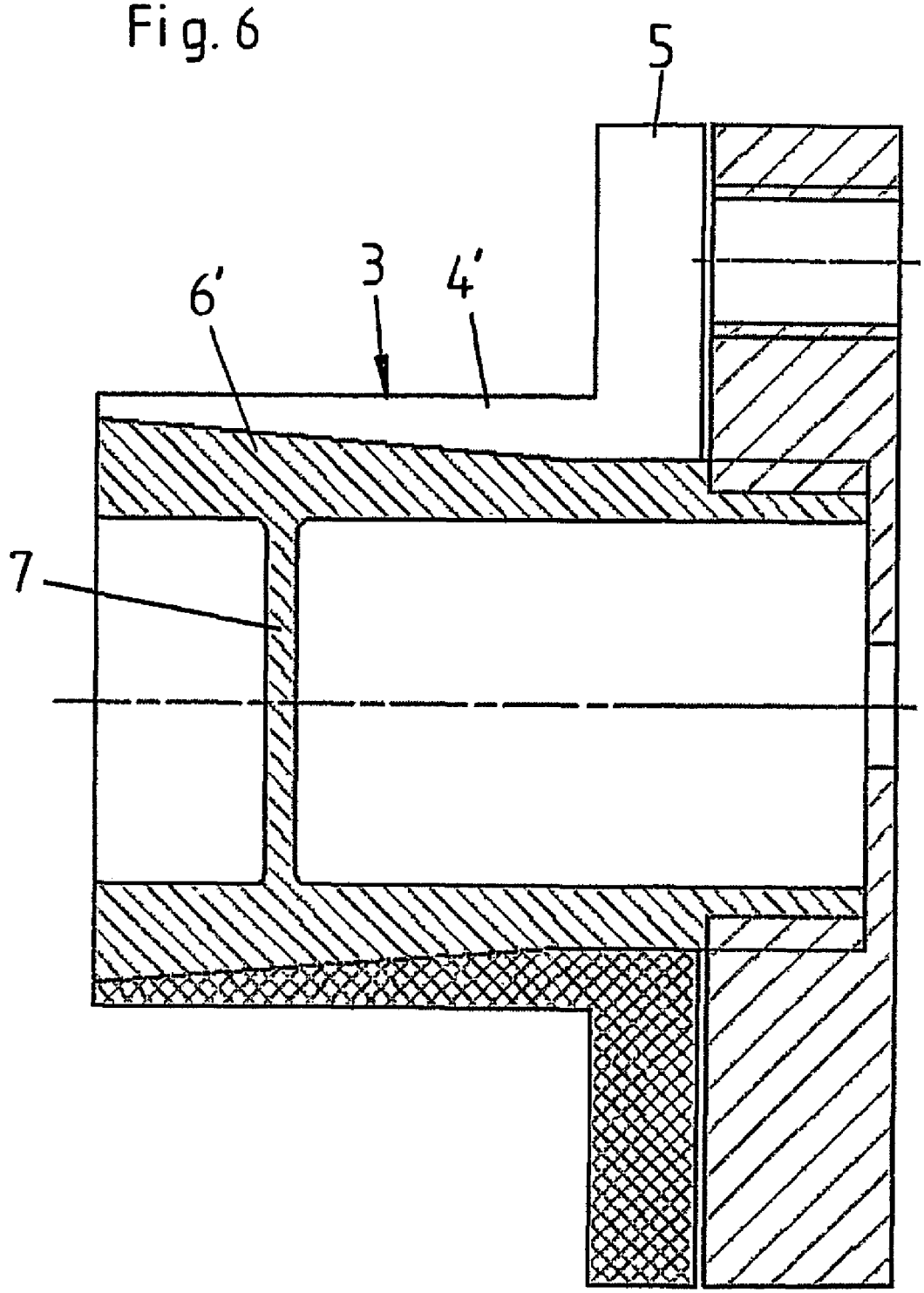
FIG. 6 is a cross section of a further embodiment of an insert according to the invention.

FIG. 1 shows a cross section through a portion of a partially shown wall 1 of a machine component for which load, which is acting upon the component to be measured. A bore 2 is arranged in the wall 1, and in the embodiment illustrated, this bore 2 is a through-bore, although it can also be a blind bore. In the bore 2 is inserted, from one side thereof, a tubular insert with a load cell, together designated 3, and incorporating an outer sleeve 4 with an integrated pressure flange 5 at one axial end thereof The inner envelope surface of the outer sleeve 4 is formed with a generally tapering saw-tooth-shape.

An inner sleeve 6 is equipped with a load cell 7. This inner sleeve 6 has an outer envelope surface formed with a generally tapering saw-tooth-shape, being a complement to the saw-tooth-shape in the inner envelope surface of the outer sleeve 4. A locking collar 8 has an inner flanged wall provided with an internal thread, which can be screwed up on an outer thread on the end of the inner sleeve opposite to the end having the tapering saw-tooth-shape, thereby allowing the inner sleeve 6 and the locking collar 8 to be detachably but firmly interconnected, thus that there is a small clearance 9 between the pressure flange 5 and the adjacent, annular part of the locking collar 8, when this is fully screwed up on the threads of the inner sleeve 6. The locking collar 8 is provided with a number of threaded through-bores 10, in each of which is positioned a grub screw 11. The ends of these grub screws 11 will push against the integrated pressure flange 5, when the grub screws 11 are tightened, thereby subjecting the outer sleeve 4 and the inner sleeve 6 to forces tending to displace the outer and inner sleeves 4, 6 in opposite axial directions, by means of the force exerted by the grub screws during their tightening and the firm interconnection between the inner sleeve 6 and the locking collar 8. The increased grip between the inner sleeve 6 and the outer sleeve 4, will make the outer sleeve 4 expand thus that it will obtain a firm grip against the bore 2 in the wall 1.

The locking collar 8 has an opening 12, intended for passage of signal cables (not shown) to the load cell 7.

FIG. 2 shows schematically a possible embodiment of a load cell 7, in which is illustrated the main direction of the load F acting on the load cell, and the positioning of strain gauges 13 forming part of the load cell 7.

FIG. 3 is an end view of the tubular insert and the load cell as seen from the left hand side in FIG. 1. In this embodiment, there is provided four through-holes 14, and the portions bridging each pair of adjacent through-holes 14 are equipped with not further shown strain gauges, which therefore, like the embodiment shown in FIG. 2, will be positioned in a similar manner as the strain gauges 13. From this view it can also be seen that the outer sleeve 4 has a longitudinal slit 15.

FIG. 4 shows the tubular insert and the load cell 3 in FIG. 3, seen from the side.

When the insert 4, 6 is inserted in the bore 2 in the wall 1, it will be easily introduced as there is a certain play between the wall of the bore 2 and the outer envelope surface of the outer sleeve 4, as long as the grub screws 11 has not been tightened. When the locking collar 8 has been screwed up on the end portion of the inner sleeve 6, and the grub screws are being tightened the expansion of the outer sleeve 4 will result in a tight fit between the bore 2, the outer sleeve 4, the inner sleeve 6 and thereby also between the bore 2 and the load cell 7, which will therefore have a sufficient pre-tension in the bore 2 to be able to emit strong signals representative for the current load on the machine component 1.

The bore 2 in the machine component 1 shall preferably be positioned at a position where there is a centre of stress, which must be calculated for each application where the load cell shall be used.

In FIG. 5 is illustrated a second embodiment of a combination of a load cell 7 and a tubular insert 3, comprising an outer sleeve 4 and an inner sleeve 6 having complementary tapering saw-tooth-formed surfaces facing each other. The main difference between the embodiment shown in this figure and the embodiment shown in FIG. 1, is that the pressure flange 5' in this case is not integrated with the outer sleeve 4, but is arranged as a loose ring, arranged to enclose an end portion of the inner sleeve 6. In FIG. 5 the parts of the combination of insert and load cell are illustrated without the bore in which it shall be introduced and it is also shown without tightening screws inserted in the threaded through bores 10. The clearance 9 between the locking collar 8 and the pressure flange 5' will be adjusted by means of said not shown tightening screws.

FIG. 6 shows still another embodiment of a combination of a load cell 7 and a tubular insert 3, comprising an outer sleeve 4' and an inner sleeve 6'. In this embodiment the outer sleeve 4' is provided with an integral pressure flange 5 in the same manner as the outer sleeve 4 of the embodiment illustrated in FIG. 1. The difference to the first mentioned embodiment is that the cooperating tapering surfaces of the inner sleeve 6' and the outer sleeve 4' are both provided with straight tapering faces, i.e. these surfaces are not saw-tooth-formed. This can be advantageous especially when the combined load cell and insert shall be used in combination with bearings of smaller size, as the dimensions of at least the outer tapering sleeve in such a case will be so small that a saw-tooth-formed taper should mean that the thinner end of the sleeve would be too thin for being rigid enough.

Otherwise the function of all three embodiments will be the same as described in connection to the embodiment shown in FIGS. 1-4.

In FIG. 7 finally is shown a cross section through an outer race ring 1' of a bearing in which race ring is provided a substantially radially extending bore 2'. The encircled portion is shown in bigger scale, and it can here easily be seen how the combined load cell and insert 3—which are here shown in simplified form—have been introduced in the through-bore 2' for effecting measurement of the load acting upon the bearing ring in an accurate and reliable manner.

The invention is not limited to the embodiments illustrated in the accompanying drawings and described with reference thereto, but modifications and variants are possible within the scope of the accompanying claims.

Thus, although the introductory part of the specification has primarily referred to problems associated with ore crushers, it is evident that the combination of a load cell and a tubular insert as claimed in the accompanying claims, can also advantageously be used at bearings supporting other types of machine members, such as e.g. a main rotor axle of a wind power plant, a main shaft of a marine propulsion unit known as POD, etcetera.

The invention claimed is:

1. A load cell assembly for a machine component having a bore, the load cell assembly comprising:
    a tubular insert including an outer sleeve insertable within the machine bore and having a tapering inner circumferential surface and an inner sleeve axially displaceable inside the outer sleeve and having a tapering outer circumferential surface complementary with the outer sleeve inner surface;
    a load cell connected to the inner sleeve of the tubular insert; and
    means for displacing the inner sleeve and the outer sleeve axially relative to each such that the sleeve outer and inner tapering surfaces slide against each other to at least partially expand the outer sleeve so as to increase a gripping force between the insert and the bore and provide a pretension to the load cell sufficient to emit signals representative of a load acting on the machine component, and wherein
    the outer surface of the inner sleeve and the inner surface of the outer sleeve have cooperating tapering sawtooth-formed profiles.

2. The load cell assembly as recited in claim 1, wherein the load cell is an integrated part of the inner sleeve.

3. The load cell assembly as recited in claim 1, wherein a locking collar is detachably connected to the inner sleeve an end of the inner sleeve remote from the inner sleeve tapering surface.

4. The load cell assembly as recited in claim 3, wherein an annular flange is provided between the locking collar and an end of the outer sleeve remote from the outer sleeve tapering surface.

5. The load cell assembly as recited in claim 4, wherein the annular flange is an integral part of the outer sleeve.

6. The load cell assembly as recited in claim 5, wherein the locking collar has a plurality of threaded through-holes extending in axial direction and housing grub screws acting as said pushing means for causing mutual axial displacement between the inner and outer sleeves.

7. The load cell assembly as recited in claim 4, wherein the annular flange is separate from the outer sleeve.

8. The load cell assembly as recited in claim 4, wherein the displacing means include pushing means arranged to push between the locking collar and the annular flange so as to relatively axially displace the inner sleeve and the outer sleeve.

9. A load cell assembly as recited in claim 1, wherein the load cell includes a disc having a plurality of through-holes and strain gauges positioned at the bridges between each pair of adjacent through-holes.

10. The load cell assembly as recited in claim 1, wherein the outer surface of the inner sleeve and the inner surface of the outer sleeve have cooperating straight tapering profiles.

* * * * *